(12) United States Patent  
Jahromi

(10) Patent No.: US 9,417,037 B2  
(45) Date of Patent: Aug. 16, 2016

(54) TELESCOPIC GUN SIGHT WITH OFFSET EYEPOINT

(71) Applicant: Omid S. Jahromi, Playa Vista, CA (US)

(72) Inventor: Omid S. Jahromi, Playa Vista, CA (US)

(73) Assignee: Lucida Research LLC, Santa Monica, CA (US)

(*) Notice: Subject to any disclaimer, the term of this patent is extended or adjusted under 35 U.S.C. 154(b) by 0 days.

(21) Appl. No.: 14/732,524

(22) Filed: Jun. 5, 2015

(65) Prior Publication Data

US 2016/0116254 A1 Apr. 28, 2016

Related U.S. Application Data

(60) Provisional application No. 62/067,562, filed on Oct. 23, 2014.

(51) Int. Cl.
  *F41G 1/38* (2006.01)
  *F41G 11/00* (2006.01)
  *G02B 26/08* (2006.01)

(52) U.S. Cl.
  CPC *F41G 1/38* (2013.01); *F41G 11/00* (2013.01); *G02B 26/0891* (2013.01)

(58) Field of Classification Search
  None
  See application file for complete search history.

(56) References Cited

U.S. PATENT DOCUMENTS

| | | | | |
|---|---|---|---|---|
| 1,563,373 A * | 12/1925 | Kauch | F41G 3/06 | 356/3 |
| 2,388,673 A * | 11/1945 | Brown | G02B 15/00 | 359/420 |
| 3,655,260 A * | 4/1972 | Bartucci | G02B 13/00 | 353/69 |
| 4,118,109 A * | 10/1978 | Crawford | G02B 26/0883 | 359/196.1 |
| 4,545,655 A | 10/1985 | Fantone et al. | | |
| 4,582,400 A | 4/1986 | Lough | | |
| 4,877,318 A * | 10/1989 | Miles | G02B 7/02 | 359/431 |
| 5,349,469 A * | 9/1994 | Francis | G02B 23/14 | 359/420 |
| 5,652,679 A * | 7/1997 | Freeman | G02B 23/02 | 359/364 |
| 5,793,525 A * | 8/1998 | Sabin | G02B 21/24 | 359/368 |
| 5,862,001 A * | 1/1999 | Sigler | G02B 1/06 | 359/211.1 |
| 6,282,021 B1 * | 8/2001 | Yano | G02B 23/18 | 359/407 |
| 7,142,357 B2 * | 11/2006 | Greenslade | F41G 1/32 | 359/353 |
| 8,599,481 B2 * | 12/2013 | Thomas | F41G 1/345 | 359/399 |
| 8,692,995 B2 * | 4/2014 | Barth | F41G 7/004 | 250/214.1 |
| 8,749,887 B2 * | 6/2014 | Jahromi | F41G 1/38 | 359/399 |
| 9,164,269 B1 * | 10/2015 | Jahromi | G02B 23/02 | |
| 2005/0039370 A1 * | 2/2005 | Strong | F41G 1/473 | 42/130 |
| 2011/0041377 A1 * | 2/2011 | Thomas | F41G 1/345 | 42/120 |
| 2014/0259853 A1 | 9/2014 | Crispin | | |
| 2015/0082680 A1 * | 3/2015 | Szapiel | G02B 23/10 | 42/130 |

OTHER PUBLICATIONS

Albregtsen, F. (2008). Reflection, refraction, diffraction, and scattering. Retrieved Nov. 28, 2015, from https://www.uio.no/studier/emner/matnat/ifi/INF-GEO4310/h09/undervisningsmateriale/imaging-kap2.pdf.*

* cited by examiner

*Primary Examiner* — Troy Chambers  
*Assistant Examiner* — Joshua Semick

(57) ABSTRACT

This invention teaches a weapon sight whose eyepoint is offset with respect to the sight's main optical axis. A refracting wedge prism is added to the optical layout of a telescopic sight to tilt the viewing axis and provide an offset eyepoint. The invention has several advantages including better ergonomics when used in combination with other type of sights such as open sights or reflex sights.

3 Claims, 4 Drawing Sheets

TELESCOPIC GUN SIGHT WITH OFFSET EYEPOINT

I. CROSS-REFERENCE TO RELATED APPLICATIONS

This application claims the benefit of provisional patent application No. 62/067,562, filed on Oct. 23, 2014 by the present inventor, which is incorporated by reference.

II. FIELD OF THE INVENTION

This application relates to optical weapon sights, specifically to a telescopic sight wherein the target image can be comfortably viewed from an offset eye position.

III. BACKGROUND OF THE INVENTION

Weapon sights are devices used to assist aiming weapons, such as rifles, by eye. An optical weapon sight is a device that allows the user to see the image of an aligned aiming point in the same focus as the target. Optical weapon sights include telescopic sights (or "riflescopes") and reflector sights (or "reflex" sights).

A telescopic sight can also magnify the target image. This enables the shooter to aim at distant targets with high accuracy. In a telescopic sight, the "point of aim" is usually designated by a reticle or cross hairs. In addition, telescopic sights are also equipped with control knobs for elevation (up-down) and windage (left-right) adjustments. These knobs allow for precise vertical and horizontal movement of the reticle so that the sight's point of aim is aligned with the weapon's "point of impact".

To use a telescopic sight, the shooter must look through the sight's eyepiece such that his eye pupil is aligned with the sights's optical axis. In addition, to see the full field of view, he has to position his eye at a set distance behind the eyepiece. This distance is called "eye relief". In most telescopic sights used for hunting, eye relief is about 10 cm or 4 inches. The concepts of exit pupil and eye relief are well-known in the art and are described in most riflescope manufacturers' catalogs.

When a riflescope is mounted on a rifle, its optical axis will be positioned higher than the optical axis of the rifle's open sights. Therefore, to aim through his riflescope, the shooter has to raise his head from the position he would otherwise uses if he were aiming with the open sights. This situation is illustrated in FIG. 1(a). The required shift in head position is more pronounced when the riflescope has a large objective lens which necessitates a high mount. For instance, a riflescope with a 56 mm objective lens requires at least 30 mm clearance between its optical axis and the rifle's receiver top surface. A high riflescope mount is also required on certain bolt-action rifles (e.g. the famous Mauser M-98) to allow for the bolt to operate freely.

To help the shooter align his eye with the optical axis of a high-mounted riflescope, some rifle stocks are equipped with a raised or adjustable comb (see FIG. 1(a)). However, a raised comb spoils the natural lines of the rifle stock. A raised comb also make the rifle unsuitable for use with open sights.

U.S. Pat. No. 4,582,400 issued to Lewis E. Lough and assigned to the United States of America as represented by the Secretary of the Army recognizes the need for lowering the eyepoint of large night sights and subsequently discloses "A periscopic eyepiece attachment connected to a telescopic night sight mounted on a small caliber weapon to move the line-of-sight of the telescopic night sight to the line-of-sight required for the day sight (iron sights) of the weapon." However, the solution disclosed in this patent is only applicable to certain night-vision sights when a large shift in the eyepoint is needed. It also requires two mirrors and a plurality of additional lenses to operate. What is needed is a telescopic sight with offset eyepoint such that the shooter can view the full field of view from a position below the objective optical axis.

Another situation where an optical sight with an offset eyepoint becomes desirable is when a secondary sight (often a non-magnifying reflector sight) is mounted on the top of the main telescopic sight (See FIG. 1(b)). This configuration is very useful in combat situations where a soldier needs to engage enemy positions at both close and far distances in quick succession. A soldier can use the non-magnifying reflector sight for engaging targets at close distances. Reflector sights have wide field of view and no pre-set eye relief. This makes them ideal for aiming at close-range and/or moving targets. The telescopic sight is used to aim at distant targets.

A major drawback of the configuration shown in FIG. 1(b) is that the telescopic sight and the reflector sight require two separate eye positions. U.S. patent application Ser. No. 13/843,445 filed by Quint Crispin on Mar. 15, 2013 discloses a telescopic sight which features a zig-zag optical path to facilitate using it in combination with a reflector sight. However, this solution requires that the objective is mounted on the side of the weapon which causes issues with ballistic trajectory compensation. It also has an odd zig-zag shape which is suitable for mounting on specific combat rifles only. What is needed is a telescopic sight which is mounted on the top of a weapon in a conventional manner yet does not require the soldier to change his eye position when switching his gaze from the reflector sight to the telescoping sight and vice versa.

IV. SUMMARY OF THE INVENTION

This invention uses the refractive property of wedge prisms to create a telescopic sight with offset eyepoint. In accordance with one embodiment, a telescopic sight is equipped with a wedge prism mounted behind its eyepiece lens. This causes the sight's eyepoint to shift to an offset position away from its main optical axis. The offset position of the eyepoint allows for a more ergonomic head position on the rifle's stock.

V. BRIEF DESCRIPTION OF THE DRAWINGS

The foregoing aspects and many of the attendant advantages of this invention will become more readily apparent with reference to the following detailed description of the invention, when taken in conjunction with the appended claims and accompanying drawings, wherein:

Figure 4A:
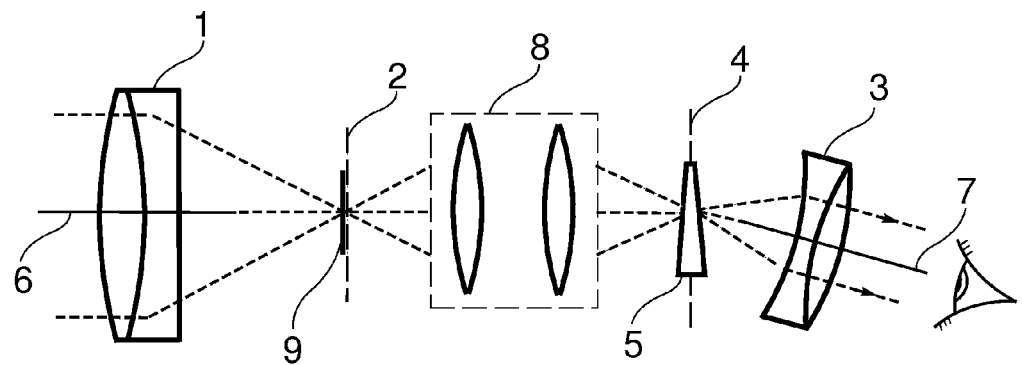
Figure 4B:
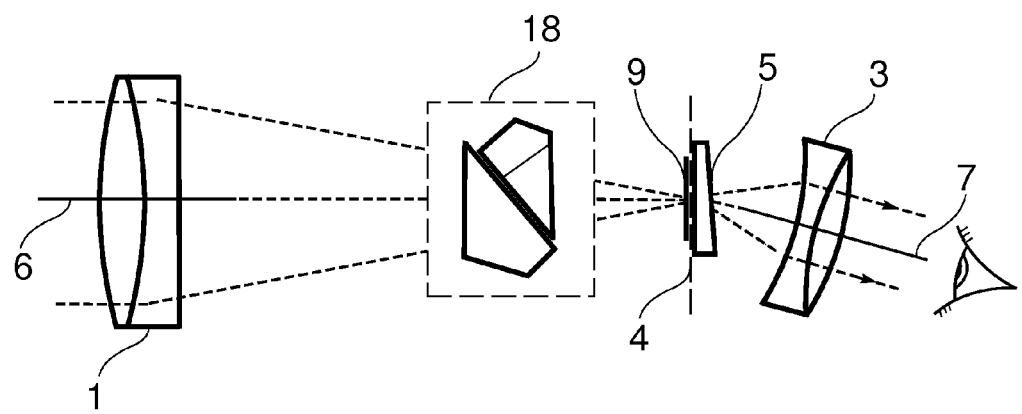

FIGS. 4(a) and 4(b) are schematics depicting a telescopic sight featuring a wedge prism at or near its eyepiece focal plane according to the first embodiment of the invention.

VI. DETAILED DESCRIPTION OF THE INVENTION

A. Principle of Operation

This invention utilizes wedge prisms which can deviate the path of a light beam by refraction. It is well-known that a wedge prism would deviate the direction of a monochromatic beam of light by α degrees where $$\alpha = \theta - \xi + \sin^{-1}(\sqrt{n^2 - \sin^2\theta} \times \sin\xi - \sin\theta\cos\xi). \quad (1)$$

Figure 1A:
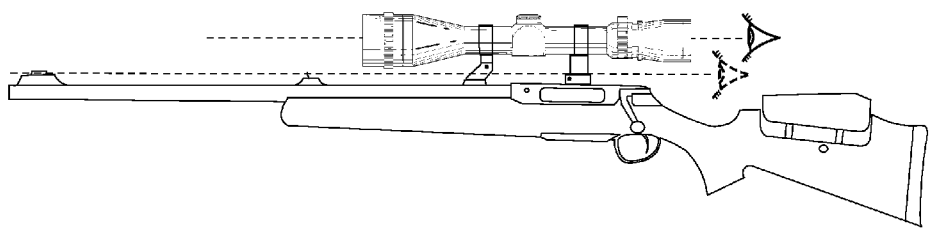
FIG. 1(a) is a schematic showing the need to change eye position when a shooter is aiming through his telescopic sight instead of using the open sights.
Figure 1B:
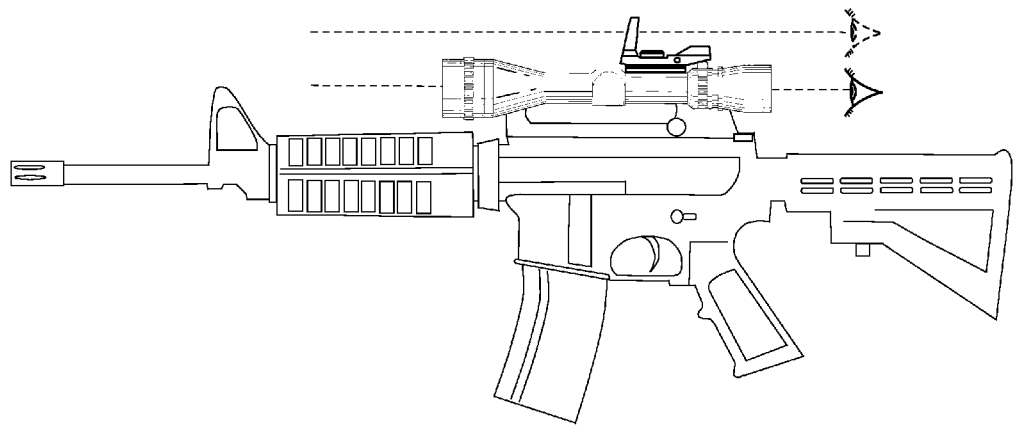
FIG. 1(b) is a schematic showing the need to change eye position when a shooter is using a combination sight formed by mounting a reflector sight on top a telescopic sight.
Figure 2A:
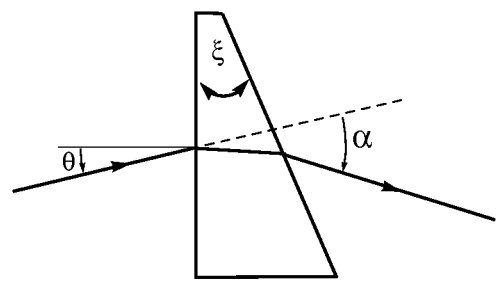
FIG. 2(a) is a schematic showing a wedge prism deviating the direction of a light beam via refraction.

In the above formula α is the beam deviation angle, ξ is the apex angle of the prism, θ is the incidence angle of the incoming beam and n is the index of refraction of the glass material used for making the prism. This notation is shown in FIG. 2(a).

For a wedge prism with small apex angle ξ and when the incidence angle θ is not too steep, (1) is simplified as $$\alpha \approx (n-1)\xi. \quad (2)$$

It is well-known that wedge prisms generally introduce abberations when placed in converging light inside an imaging system. However, this is not a serious liability. After all, lenses also introduce abberations. A well-corrected lens system comprises a combination of lenses that are individually uncorrected but together well-corrected. In the same way, a well-corrected prism system can be designed by combining an appropriate collection of wedge prisms together.

Figure 2B:
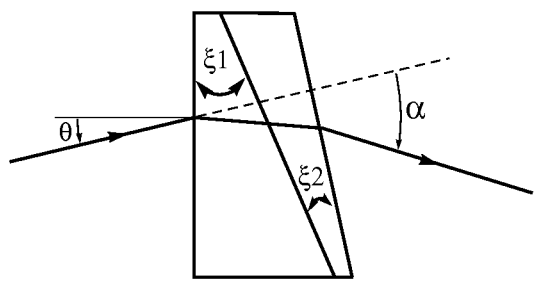
FIG. 2(b) is a schematic showing an achromatic prism.

When a wedge prism is used to bend the path of a collimated (parallel) polychromatic light beam, the only major abberation introduced is chromatic change in the beam deviation angle. This abberation can be corrected by using an achromatic prism. An achromatic prism is made by combining two or more prisms of different refractive index as shown in FIG. 2(b). The component prisms are so designed and placed that a ray of polychromatic light passing through the prism is deviated but not dispersed into a spectrum. Persons skilled in the art of optical engineering are familiar with the design of achromatic prisms so this topic is not discussed further in this section.

Figure 3A:
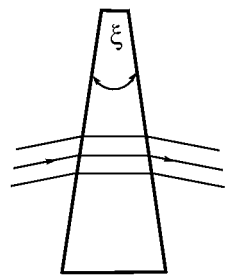
FIG. 3(a) is a schematic showing a wedge prism placed in the path of a collimated light beam at minimum deviation.

Another method to reduce chromatic abberation when a prism is used in a collimated beam is to configure the prism such that it works at "minimum deviation". As discussed above, the deviation angle in a prism depends upon the angle of incidence θ. The deviation angle first decreases with increasing incidence angle, and then it increases. There is an angle of incidence θ at which the deviation angle α is minimum. The deviation angle at this point is called the "minimum deviation" angle, or "angle of minimum deviation". At the minimum deviation angle, the incidence and exit angles of the ray are identical. If the prism is made in the form of an isosceles triangle, at minimum deviation the light beam passes parallel to the prism base as shown in FIG. 3(a).

Figure 3B:
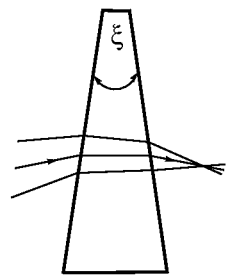
FIG. 3(b) is a schematic showing a wedge prism operating at minimum deviation placed in the path of a converging light beam near the beam's focus.
Figure 3C:
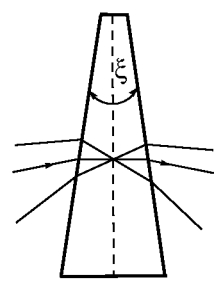
FIG. 3(c) is a schematic showing a wedge prism placed at the focus plane of a converging light beam such that the image plane is inside the prism.
Figure 3D:
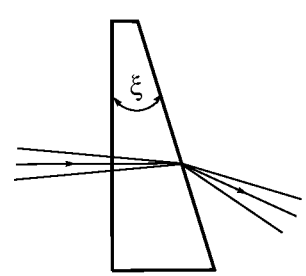
FIG. 3(d) is a schematic showing a wedge prism placed near the focus plane of a converging light beam such that an image is formed on one surface of the prism.

Wedge prisms can also be used in converging light to tilt, or correct the tilt of, an image plane. In this case abberations such as coma and astigmatism might be introduced by the prism. It is possible to design a wedge prism with a particular apex angle ξ or tilt angle α such that either coma or astigmatism is zero. Examples of cases which lead to reduced aberrations are shown in FIG. 3(b) through 3(d). In the special case of FIG. 3(c) where the prism is at minimum deviation and the image plane is inside the prism, both coma and astigmatism are reduced to zero. The reader is referred to the papers by J. W Howard (Applied Optics, Vol. 24, No. 23, December 1985, pp. 4265-4268) and C. J Barth and D. Oepts (Applied Optics, Vol. 27, No. 18, September 1988, pp. 3838-3844) where methods for stigmatic and coma-free imaging with wedge prisms are described in detail.

B. First Embodiment of the Invention

A first preferred embodiment of the invention is shown in FIGS. 4(a) and 4(b). With reference to FIG. 4(a), the telescopic gun sight with offset eyepoint has an objective lens 1 which forms a first image of the target at the sight's first focal plane 2. The objective lens has an optical axis 6 which also defines the sight's main optical axis and the general direction of aim. A reticle or cross hairs 9 is positioned coplanar with the first focal plane 2 to designate the point of aim. The image formed by the objective lens 1 is laterally reversed and upside-down. Thus, an image-erecting means 8 is positioned after the first focal plane to convert the first image of the target formed by the objective into an upright and laterally-correct second image of the target at the sight's second focal plane 4. A wedge prism 5 is positioned at the second focal plane such that the second image of the target is formed inside the prism. The wedge prism 5 is designed and configured such that the optical path of the cone of light emerging from it deviates downwards at a predetermined angle (similar to the situation shown in FIG. 3(c)). The eyepiece lens 3 is positioned after the wedge prism 5 and is mounted at a tilt such that its optical axis 7 is aligned with central ray of the refracted light cone emerging from the wedge prism 5.

As shown in FIG. 4(a), the eyepiece optical axis 7 (which defines the viewing axis of the telescopic sight) is tilted with respect to the sight's main optical axis 6 (which defines the general direction of aim). To view an image of the target, the shooter must position his eye on the viewing axis at a predetermined distance behind the eyepiece (known as "eye relief"). Since the viewing axis is tilted, the sight's eyepoint will be offset with respect to the sight's main optical axis.

The image erecting means 8 is depicted in FIG. 4(a) as a focal system. This is the case when the image erecting means is comprised of one or more lenses. It is also possible to use an afocal image erecting means comprising one or more prisms. Well-known examples include Abbe-Koenig prisms and Schmidt-Pechan prisms.

FIG. 4(b) shows how to adapt the telescopic gun sight described in the present embodiment to use an afocal (prismatic) image-erecting means. With reference to this figure, the afocal image-erecting means 8 is positioned in the converging beam of the objective lens before its focal plane. In this configuration the sight's first focal plane will be coplanar with the second focal plane 4. The reticle 9 is also placed in this same plane.

Persons skilled in the art of optical engineering would be familiar with the design of both focal (lens-based) and afocal (prismatic) image-erecting means suitable for use in the present invention.

As described previously in Section VI-A, a refracting wedge prism can be positioned at or near the image plane of an imaging system to tilt said image plane. FIG. 4(b) shows the wedge prism 5 positioned close to the second focal plane 4 where an erect image of the target is formed. With reference to FIGS. 4(a) and 4(b), the optical designer can determine an optimal position for the wedge prism 5 at or near the focal plane 4 such that optical abberations such as coma and astigmatism are well-corrected.

E. How to Use the Invention

In a first use case, the telescopic sight with offset eyepoint is mounted on a hunting rifle which also has open sights. In this case the wedge prism 5 is configured with its base facing downwards. This causes the sight's viewing axis to tilt downwards. The tilted viewing axis allows the shooter to aim at his target from the same head position he would use when aiming with the rifle's open sights. This greatly enhances aiming ergonomics and eliminates the need for a raised rifle stock.

In a second case, the telescopic sight with offset eyepoint is mounted on a combat rifle together with a reflex sight. In this case the wedge prism 5 is configured with its base facing upwards. This causes the sight's viewing axis to tilt upwards which, in turn, allows the shooter to aim through his telescopic sight from a higher head position in line with the reflex sight. This greatly enhances aiming ergonomics and eliminates the need for changing head position when switching between the reflex sight and the telescopic sight.

F. Advantages

Based on the above descriptions of the invention, a number of advantages over prior art are readily apparent:
1. The invention makes it possible to tilt the viewing axis of a telescopic gun sight by any desired amount up to about 30 degrees in any desired orientation.
2. The invention makes it possible to position the eyepoint of a telescopic gun sight at a predetermined offset with respect the sight's main optical axis. The offset can be at any desired orientation (e.g. up, down or to the sides).
3. The invention is easy to make and can be retrofitted to existing telescopic sight designs.

VII. CONCLUSION, RAMIFICATIONS, AND SCOPE

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention.

While the above descriptions of the present invention contain numerous specificities, they should not be construed as limiting the scope of the invention, but as mere illustrations of some of the preferred embodiments thereof. Many other ramifications and variations are possible within the expositions of the various embodiments. For example:
1. FIGS. 4(a) and 4(b) show the viewing axis being tilted in the downward direction. This is done for the purpose of illustration. One can readily adapt the methodology described in this invention to shift a telescopic gun sight's eyepoint in any desired direction.
2. In FIG. 4(a), the reticle 9 can be placed either at the first focal plane 2 or at the second focal plane 4. In FIG. 4(a), the two focal planes coincide and the reticle 9 is placed at the same plane as the two (overlapping) focal planes.
3. For simplicity and brevity, the telescopic sight's housing and the mechanism to adjust the reticle for windage and elevation are not described in the present application. A person of ordinary skill in the art of making telescopic sights would be familiar with adapting a suitable housing and adjustment mechanism from existing art for use with the present invention.

Therefore, such adaptations and modifications are intended to be within the meaning and range of equivalents of the disclosed embodiments, based on the teachings and guidance presented herein.

It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art. Thus, the scope of the invention should be determined by the appended claims and their legal equivalents, as opposed to the embodiments illustrated.

What is claimed is:

1. A telescopic sight for designating a weapon's point of aim when pointed at a target, comprising:
   a. an objective lens, said objective lens forming a single reversed image of the target, said objective lens having a first focal plane and an optical axis,
   b. an image-erecting means for converting said reversed image into an upright and laterally-correct image, said image erecting means being positioned on the objective optical axis after said objective lens,
   c. an eyepiece lens for converting said upright and laterally-correct image into a virtual image of the target viewable by an operator, said eyepiece lens having a second focal plane and an optical axis, said eyepiece lens being positioned after said image erecting means, said eyepiece lens being mounted such that its optical axis has a predetermined tilt with respect to the objective optical axis,
   d. a reticle for indicating the point of aim, said reticle being positioned coplanar with either said first focal plane or said second focal plane, and
   e. a refracting wedge prism, said refracting wedge prism having a predetermined apex angle, said refracting wedge prism being positioned between said image-erecting means and said eyepiece lens, said refracting wedge prism being positioned at or close to said second focal plane,
   whereby the operator can view said virtual image of the target from a position offset from said optical axis.

2. The telescopic sight of claim 1 wherein said refracting wedge prism is comprised of an achromatic prism.

3. The telescopic sight of claim 1 wherein said refracting wedge prism is positioned such that it operates at minimum deviation.

* * * * *